United States Patent [19]

Staar

[11] 3,872,506

[45] Mar. 18, 1975

[54] APPARATUS FOR AUTOMATICALLY PLAYING BACK INFORMATION IN CASSETTES

[76] Inventor: Marcel Jules Helene Staar, 479 Avenue Louise, Brussels, Belgium

[22] Filed: Sept. 7, 1971

[21] Appl. No.: 177,987

[30] Foreign Application Priority Data

Sept. 7, 1970 Belgium .............................. 755810

[52] U.S. Cl. .................................... 360/92, 360/105

[51] Int. Cl. ............................................. G11b 5/00

[58] Field of Search .......................... 274/4 F, 10 D; 179/100.2 Z; 340/174.1 C, 162; 353/25, 117; 250/219 CR; 40/68.4, 78.05

[56] References Cited

UNITED STATES PATENTS

| | | | |
|---|---|---|---|
| 3,183,494 | 5/1965 | Welsh | 274/4 F |
| 3,183,495 | 5/1965 | Blain | 274/4 F |
| 3,221,302 | 11/1965 | Silverberg | 250/219 CR |
| 3,238,842 | 3/1966 | Wikland et al. | 353/120 |
| 3,238,842 | 3/1966 | Wikland et al. | 274/4 B |
| 3,278,188 | 10/1966 | Chamberlin | 274/4 F |
| 3,484,055 | 12/1969 | Raine | 274/4 F |
| 3,588,243 | 6/1971 | Osawa | 353/25 |

*Primary Examiner*—Harry N. Haroian
*Attorney, Agent, or Firm*—Waters, Roditi, Schwartz & Nissen

[57] ABSTRACT

Apparatus for automatically playing back with selection recordings in cassettes, the apparatus comprising a stationary circular magazine containing radially disposed cassettes, the centre of the magazine containing a rotating bearing member bearing a playback facility and driven so as to bring the assembly in correspondance with the cassette containing the said recordings and a selector device comprising choice-formulating means is provided. Marks are disposed with which reading heads cooperate so that a correspondance between the position of the marks and the reading heads causes a selector, adapted to set up a choice, to control a drive motor.

8 Claims, 7 Drawing Figures

APPARATUS FOR AUTOMATICALLY PLAYING BACK INFORMATION IN CASSETTES

The invention relates to apparatus for recording or reproducing general items of information, which may be in code or musical and are contained in a series of cassettes.

The invention aims to provide apparatus giving automatic, rapid access to any selected cassette and, if required, to any portion of one or more recordings contained in a cassette.

The apparatus is essentially characterised in that it comprises a stationary circular magazine wherein cassettes containing recording media are radially disposed, the magazine also containing a rotating bearing means occupying a central position and on which an information facility is mounted and which is driven by a drive mechanism so that it can move the information-processing unit opposite the cassette containing the information, a selector device being provided, the selector comprising means for formulating a choice governing the behaviour of the apparatus.

The cassettes, therefore, are disposed in a stationary magazine allowing easy access and the mechanism can be relatively light and thus move relatively easily because of its low inertia. Because of its low inertia, the mechanism can be brought opposite each cassette in a very short time, since the acceleration and deceleration times are reduced to a very small amount.

Advantageously, in order to reduce immediate losses of time, the cassette used can be of the type comprising an elongate core and two half-covers forming a casing and assembled so as automatically to leave sufficient space for the band to be suitably driven and guided, so that the core acts as a drive shoe and the casing is formed with windows or openings which have a minimum area and allow access to those parts of the band which are necessary for driving it and playing the recordings and reading the markers. At one corner of the cassette on the side which engages in a playback device the casing may be provided with a bevel or rounded portion which facilitates insertion between a playback head and a movable part of the playback device and also prevents any faulty manipulation, in that the user has to insert the cassette so that its surface formed with window is on the same side as the playback head.

The apparatus is designed so that it can retrieve and reproduce, on the one hand, mainly musical recordings disposed in a spiral on the magnetic medium and, on the other hand, any recordings, whether coded or otherwise, disposed on a number of parallel tracks. The latter feature is suitable for multiple recording for short periods, and the beginning and end of recording in a track can be defined by a mark on the magnetic medium. The apparatus may be characterized in that means are provided for automatically adjusting the position of the playback head with respect to the theoretical axis of the recording or playback track, the adjustment being controlled by or made dependent on a marker connected to the recording support. In the apparatus, a screw driving the head rotates at a speed which is e.g., 5 to 10% greater than the theoretical shift required for the head to remain in a centered position on the spiral support track, means being provided for stopping the rotation of the screw and consequently stopping the shift of the recording or playback head whereas the recording support continues to move so that when the head has nearly reached the end of a revolution, it occupies a position slightly in advance of the theoretical axis of the spiral, and the stoppage lasts merely long enough for the recording or playback head to be placed again on the theoretical axis of the track, the device being restarted by the marker connected to the tape. An optical or electric marker accurately determines a well-defined position which the head should occupy at this instant. The position is always the same, exactly in the middle of the theoretical track.

The invention will be more clearly understood from the following description of an embodiment with reference to the drawings, in which.

Figures 1, 2:
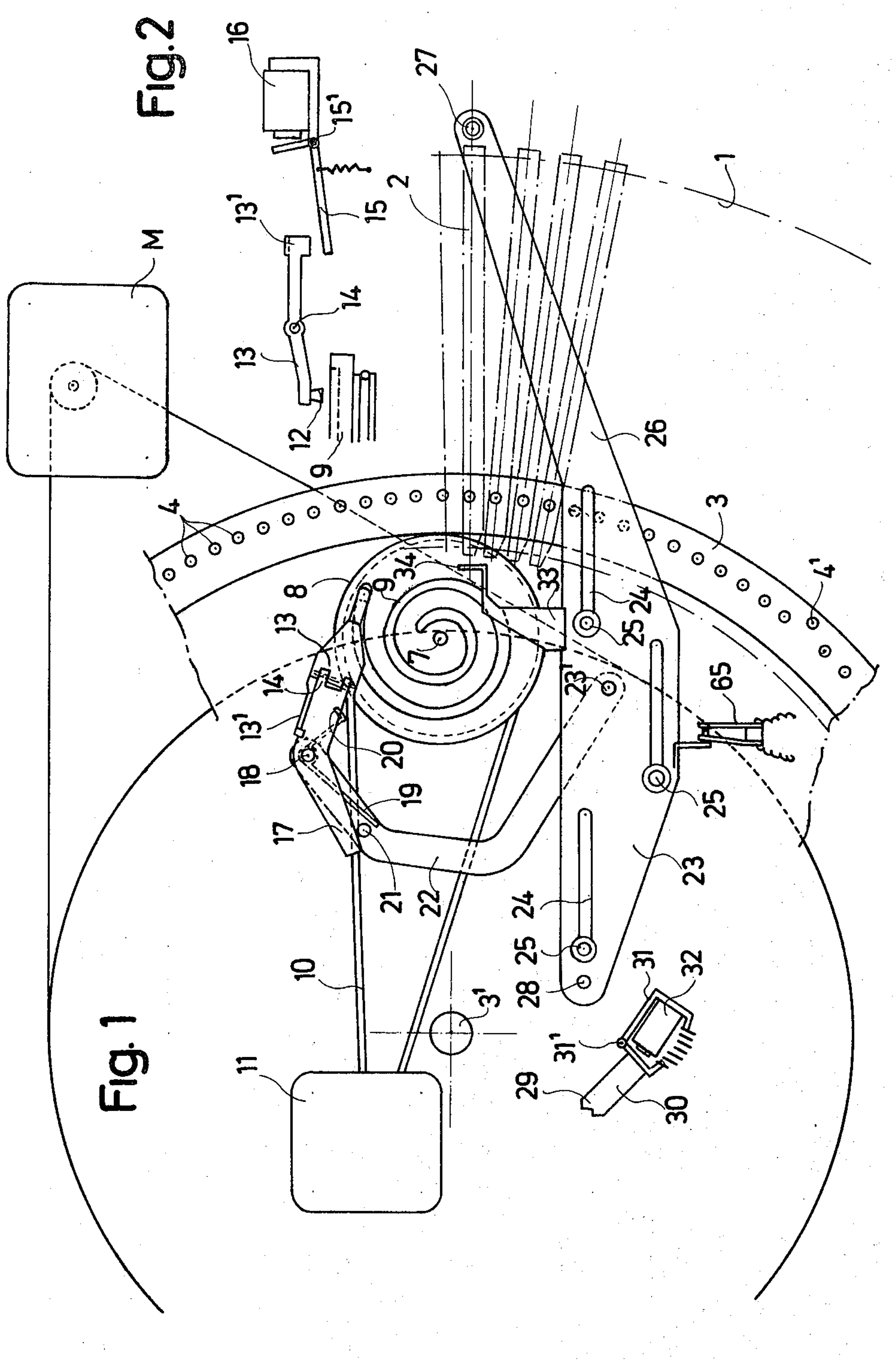
FIG. 1 is a diagrammatic plan view of the main parts of the apparatus.
FIG. 2 shows a detail.

The apparatus comprises an annular stationary circular magazine 1 containing radially disposed cassettes 2 (there are assumed to be about a hundred in the present example) containing recording media, the apparatus also comprising a turntable 3 which near its centre bears an information playback assembly which will be described hereinafter.

The turn-table 3 is driven by a motor M adapted to bring the playback assembly successively opposite the cassettes disposed around it.

Coded counting or locating means read by photo-electric cells are provided in order to bring the playback mechanism to a position corresponding to that of the cassette which it is desired to use.

For example, the peripheral edge of the turn-table can be formed with a series of holes 4 equal in number to the cassettes, plus an additional hole $4^1$ which is offset in order to define a zero position of the turn-table.

The holes serving as marks are disposed in angular positions corresponding to each cassette location.

Figures 4, 5:
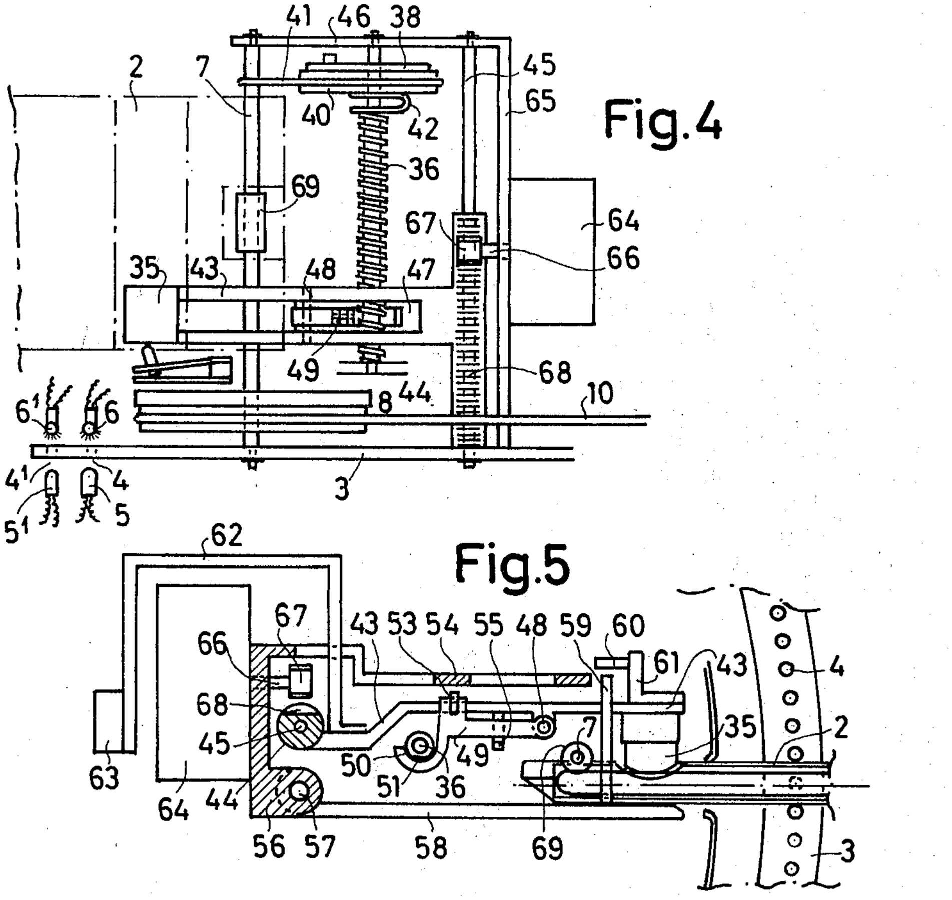

As a rule, a photo-electric cell 5 (FIG. 4) co-operating with a lamp 6 is used to count the number of holes 4, and the hole $4^1$ is read by a photo-electric cell $5^1$ co-operating with a lamp $6^1$ (FIG. 4). The cell $5^1$ is therefore used to locate the zero hole serving as the starting point for counting.

The apparatus comprises a selector device which formulates a choice governing the behaviour of the playback assembly.

The selector device can e.g., be a conventional commercial manual selector in the form of small multiple switches having indexed positions. As described hereinbelow, the selector device includes the counting arrangement comprising holes 4,4', and the reading system comprising photo-electric cell 5 and lamp 6. Each position of the multiple switch corresponds to a digit and identifies the latter by a code combination which can be directly interpreted via the input $E_1$ and $E_2$.

If for example the selector device sets up a required cassette number 67, the drive motor begins to rotate the turn-table 3 from the zero or starting position. The counting cell 5 begins to count the holes 4.

After reaching the 67th hole, an electronic system to be described hereinafter detects the agreement between the number set up and the 67th hole counted by the photo-electric cell. The drive motor M can then be ordered to stop rotating the turntable 3. The cycle continues and the cassette can be used.

When the information contained in cassette No. 67 has been used, the cassette is ejected and the drive motor M re-starts and resets turn-table 3 in its zero position, which is marked by the other photo-electric cell (cell 5[1]). A new selection can then be made.

A system of coded holes read by a number of photo-electric cells can also be provided, in which case each group of coded holes corresponds to one cassette number.

Figure 6:
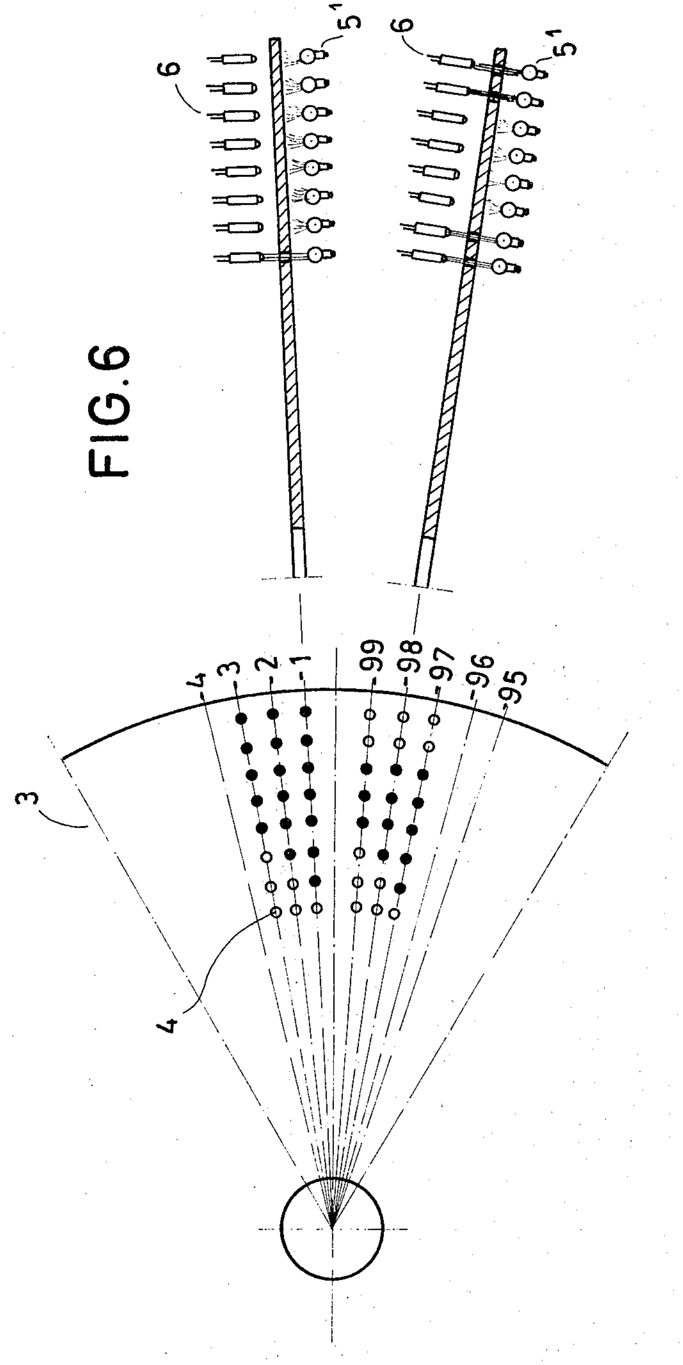
FIG. 6 shows a detail of an alternative embodiment of the cassette locating facility.

FIG. 6, which refers to the last-mentioned embodiment, shows rows of holes 4 and cells 5, each co-operating with a lamp 6.

It is not necessary therefore to return the rotating bearing member to zero for a new selection operation. It is merely necessary to compare a code corresponding to a required number, with the code read on the track of the turn-table. As soon as the two are in agreement, a stop order can be given to the drive motor and the sequence continues.

Of course, the marks on their reading cells can each be placed either on the stationary element or on the mobile element, from the instant when they co-operate with one another. If required, therefore, coded marks can be placed directly on the cassette so that the cassette can be readily located by a suitable selector.

At this instant, we can assume that the cassettes bearing identification marks are secured to the stationary magazine. When, therefore, a search is made during a selection operation, the cassettes are almost completely prevented from angular movement in the stationary magazine.

A wheel 8 keyed on a vertical shaft 7 secured to turn-table 3 is formed with a spiral 9 and is driven by a belt 10 controlled by a motor 11 (FIG. 1).

A pin 12 (FIGS. 1 and 2) can be introduced into the spiral 9. Pin 12 is borne by a lever 13 which can pivot around a shaft 14 and one end of which is acted upon by a crank lever 15 actuated by a solenoid valve 16 and pivoting at 15[1].

A flat crank lever 17 (FIG. 1), which is also mounted on shaft 14, is connected to lever 13 to form a hinge.

Lever 17 pivots around a shaft 18 on which a spring 19 is coiled. One end of spring 19 has a hook 20 which engages the edge of lever 17, and the other end bears against an abutment 21 secured to a flat lever 22 having three arms, one side arm being pivotable around shaft 18 and the other being pivotably connected at 23[1] to a flat arm 23 used for introducing cassettes into the playback mechanism.

Grooves 24 in arm 23 can slide on pins 25 secured to turn-table 3. Arm 23 has an extension 26 which extends below magazine 1 and the end of which bears a pin 27 disposed so as to act on the chosen cassette and move it towards the interior of the turn-table when the arm 23 slides.

The interior end of arm 23 bears a pin 28 which locks arm 23 by co-operating with a notch 29 formed in a lug 30 secured to the armature 31 of a solenoid valve 32 which can pivot at 31[1].

One edge of arm 23 bears a finger 33 (FIG. 1) bearing an abutment 34 which abuts the cassette when ejected.

If the recording on the tape in the cassette is in a spiral, head 35 can be driven by a member 51 engaging a worm 36, using means for automatically adjusting the position of the recording or reading head with respect to the axis of the recording track.

Worm 36 is prolonged by a coupling (not shown) secured to a turn-table 38 driven via a friction coupling (not shown) by means of the turn-table 3 rotating freely on the friction coupling and formed with a rim 40 having a groove receiving a driving belt 41 driven by shaft 7.

Head 35 is driven by being secured to a plate 43, the end of which is connected to a column 44 to form a unit 35-43-44 which can slide along a vertical shaft 45 secured to turntable 3. Shaft 45 is connected to an upper plate 46 in which the vertical driving shaft 7 rotates.

Plate 43 has a slot 47 which extends over most of its length (FIG. 4) and having sides connected at a certain place by a shaft 48 bearing a lever 49 having a nose 50 the hollow of which is formed with teeth 51 which can engage the worm 36.

Lever 49 also bears a fork 52 bearing a wheel 53 which can co-operate with a bar 54 forming part of the stationary frame.

The pivoting of arm 49 is limited by an abutment 55 borne by plate 43 (FIG. 5).

An arm 58 is pivotably mounted at 57 on a portion 56 of the stationary frame. Arm 58 guides the cassette when the latter is introduced into the playback facility.

Guide 58 is integral with a perpendicularly-disposed rod 59, the end of which can co-operate with a tenon 60 borne by an angle iron 61 secured to plate 43.

A bracket-shaped balancing assembly 62 has a counterweight 63 and is secured to plate 43.

If the items of information are short, e.g., coded letters, the recordings are distributed over a certain number of parallel tracks on the magnetic medium.

The reading head 35 is then brought to the required track in accordance with the second part of the set-up selection process, using a locating facility identical with the one used to locate the position of a cassette.

Figure 3:
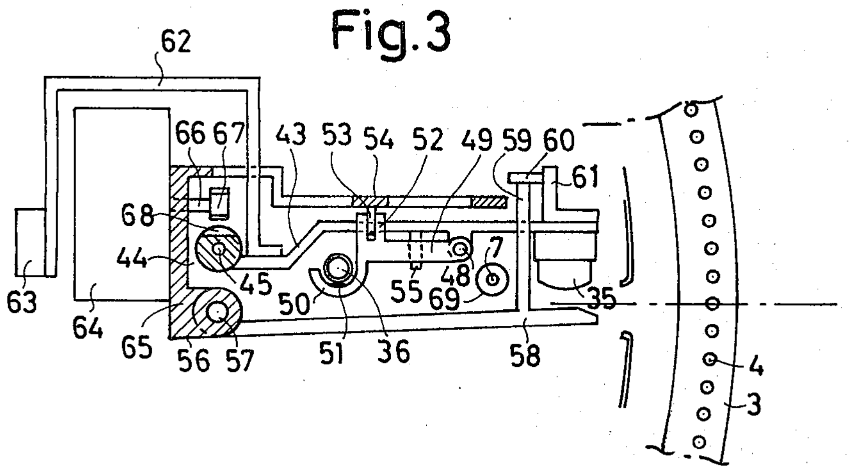
FIGS. 3–5 show how the turn-table co-operates with the recording and playback device.

To this end, a preferably step-by-step motor 64 is secured to an upright 65 (FIG. 3) and the motor shaft 66 bears a gearwheel 67 engaging a rack 68 formed on column 44.

Alternatively, the step-by-step motor 64 can merely receive a number of pulses corresponding to the number of the selected track.

Description of the mechanical cycle

It will be assumed that the turn-table 3 wich bears the mechanism and is to be positioned in a manner corresponding to a chosen cassette 2, is in a zero position determined by the hole 4[1] in the turn-table.

The motor M driving turn-table 3 starts as soon as a selection has been made by a manual or electronic selector.

As soon as the selected number coincides with the corresponding number of counted holes (a photo-electric cell may e.g., be used for counting) the motor stops as the result of a comparison coincidence made by a device described hereinafter in the electronic part of the description.

The comparator also supplies solenoid valve 16 (FIG. 2) with a pulse such that the lever 15 pivots, strikes the end of arm 13, and pivots arm 13 around shaft 14; pin 12 engages spiral 9 of wheel 8, which is driven by motor 11.

The cranked lever 17, which is secured to lever 13, then pivots around the shaft 18 and drives lever 22 which, since it is connected at 23[1], slides plate 23 in the direction of arrow F, thus driving the cassette by means of the pin 27 provided on the extension 26.

The cassette slides between, firstly, guide 58 and, secondly, the reading head 35 and the pressure roller 69 driving the magnetic tape. The cassette is thus moved towards the playback unit.

The reading head 35, which has been pushed aside by the cassette during its introduction, is automatically in contact with the magnetic recording medium.

Alternative A

If the recording on the magnetic sleeve is in a spiral, head 35 is driven by worm 36 and the position of the recording or reading head with respect to the recording track shaft is automatically adjusted.

Alternative B

If the items of information are short, the recordings are disposed on a series of parallel individual tracks. In the latter case, the assembly consisting of motor 64, shaft 66 and gearwheel 67 is disposed so that gearwheel 67 makes contact with rack 68 so that, when motor 64 rotates, the rack moves the reading head 35 which is secured to column 44 by plate 43.

The position of head 35 depends on the number of pulses received by its step-by-step motor, corresponding to the location which it needs to occupy in order to be on the track required by a selector.

In alternative A, the end of a selection process occurs when a silence or absence of recording for e.g., two seconds coincides with the reading of a mark on the tape, e.g., the mark provided in alternative A.

In the case of alternative B, the end of the operation, is dependent merely on the reading of the mark by the photo-electric cell.

At the latter instant, the information showing that the selection has terminated takes the form of a triggering order given to solenoid valve 32 which releases the sliding plate 23 which has been locked at 29. Under the action of a spring, plate 23 moves in the opposite direction to arrow F and conveys the cassette into its compartment in the magazine.

In alternative, A, the cassette after coming out slightly displaces guide 58 so that rod 59 acts on tenon 60. As a result, plate 43 pivots at 45 and roller 53 is brought in contact with element 54, thus releasing teeth 51 from worm 36. Head 35 thus returns to its rest position under the action of a return spring.

In alternative B, motor 64 receives an order to rotate in the opposite direction to the direction for bringing head 35 to its operating position, so that head 35 is brought back to zero position.

The motor driving turn-table 3 returns the turntable to the zero position, which is shown by the hole 4[1] detected by the photo-electric cell 5[1]. The motor stops and the apparatus is in its starting position. A new cycle can begin if a new selection has been formulated or immediately it comes into operation.

Figure 7:
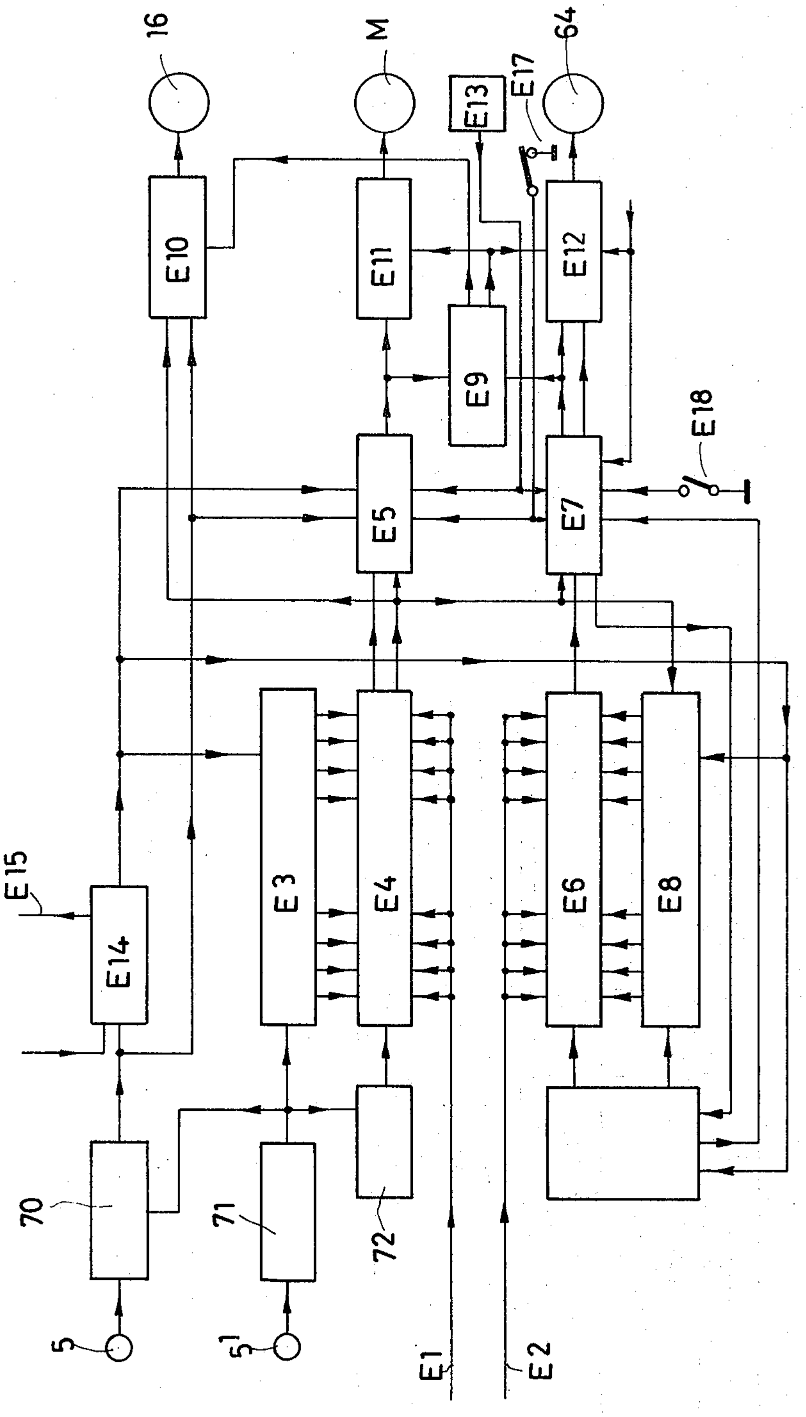
FIG. 7 is an electronic circuit showing the main elements required in operation. Since each element is of conventional construction, its function will be shown in the form of block diagrams.

We shall now describe the electronic operation with reference to FIG. 7 which shows:

| | |
|---|---|
| $E_1$ | : cassette code |
| $E_2$ | : reading head code |
| $E_3$ | : units and tens counter |
| $E_4$ | : a comparator |
| $E_5$ | : start-stop facility for cassette motor pulses |

-Continued

| | |
|---|---|
| $E_6$ | : a comparator |
| $E_7$ | : start-stop facility and direction of head motor |
| $E_8$ | : units and tens counter |
| $E_9$ | : cut-off of motor supply |
| $E_{10}$ | : supply to circuit-making solenoid valve |
| 16 | : circuit-making solenoid valve |
| $E_{11}$ | : supply to cassette motor |
| $E_{12}$ | : supply to heat motor |
| $E_{13}$ | : starting condition |
| M | : motor for searching for cassettes |
| 64 | : head motor |
| $E_{14}$ | : restoring pulse |
| $E_{15}$ | : information going to an external selector |
| $E_{16}$ | : pulse generator for counters and comparators |
| $E_{17}$ and $E_{18}$ | : switches |
| 70 | : detector of zero detection cell with storage facility |
| 71 | : amplification of counting cell |
| 72 | : reference pulse. |

The assembly is at rest in a zero position, i.e., the location hole 4[1] is opposite the photo-electric cell 5[1].

As soon as the selection of a cassette and, if required, of a track has been shown (in the present case in the form of binary codes at $E_1$ and $E_2$) the motor M is supplied by $E_{11}$ on an instruction from $E_5$ and drives the turn-table bearing the mechanism.

The photo-electric cell 5 counts the holes 4 moving past, and the number appearing in counter $E_3$ is compared by $E_4$ to the number set up at the input $E_1$.

As soon as the number of holes read coincides with the selection set up at $E_1$, the motor M is no longer supplied via $E_{11}$ and the playback mechanism is held in front of the selected cassette.

Meanwhile, if required, the track selection code set up at $E_2$ has been compared at $E_3$ with the number of pulses received by a step-by-step motor 64 via $E_{12}$ on the instruction of $E_7$, the pulses being counted by $E_8$.

As soon as the number of pulses received coincides with the number appearing in the counter $E_8$, the motor 64 stops being supplied by $E_{12}$ and the head is held stationary on the required track.

$E_9$ detects the instant when the motor M and the motor 64 cease to receive pulses and via $E_{10}$ actuates valve 16 which initiates a cycle during which a cassette enters the playback facility.

Conventional means are used to enable the apparatus to process the recorded information.

The detection of the end of recording, e.g., the reading of a mark on the recording medium by a photo-electric cell, acts on valve 32 which releases lever 23 which returns to its original position under the action of a return spring and during its movement drives the required cassette into its magazine compartment.

Towards the end of its movement back to its rest position, lever 23 acts on switch 65 which enables the cycle to recommence.

Motor 64 is supplied by $E_{12}$ in the opposite direction decided by $E_7$, and returns the reading head to zero position.

As soon as the head reaches its zero position as detected by switch 18, the latter instructs $E_5$ to allow $E_{11}$ to supply motor M which begins to turn and drives the turntable until cell 5[1] has detected hole 4[1].

After detecting the zero point, cell 5[1] acts on $E_{14}$ which via $E_5$ prevents $E_{11}$ from continuing to supply motor M, which stops.

At the last-mentioned instant, $E_{14}$ can also via $E_{15}$ supply an external selector with an item of information, such as a pulse of level for cancelling the preceding selection at $E_1$ and $E_2$. The apparatus is at rest at the zero position.

Since the registers $E_1$ and $E_2$ are empty, a new selection can be received. Immediately it appears, the cycle can recommence.

What I claim is:

1. In an apparatus for automatically playing back adapted to automatically select recordings stored in cassettes comprising: a stationary circular magazine having a plurality of radially extending cassettes disposed therein; a turntable centrally located in said magazine, a playback device mounted on said turntable, said playback device and said magazine being in substantially coplanar relationship; means for rotating said turntable so as to sequentially convey the playback device into correspondence with a predetermined one of said cassettes; a selector device, said selector device comprising means for determining a selection and controlling the operation of the apparatus, counting and locating means, reading cells for determining the position of said counting and locating means, and a driving motor controlled by said selector device for positioning the playback apparatus in sequential order opposite the cassettes disposed thereabout, said turntable having marks thereon forming said counting and locating means of said selector device.

2. Apparatus according to claim 1, said marks comprising a system of groups of coded holes formed in the edge of said turntable and adapted to be read by a number of photo-electric cells, each group of coded holes corresponding to respectively one cassette and the system comprising rows of holes and cells radially arranged on the turntable; and a lamp cooperating with each said group.

3. An apparatus according to claim 1, said marks including a plurality of holes formed about the peripheral edge of said turntable and being equal in number to the number of cassettes, and additional offset hole being formed on said edge for marking a zero position of the turntable; the counting and locating elements comprising a reading cell for counting the number of said first-mentioned series of holes, and an additional reading cell for locating the zero hole forming the starting point for counting.

4. Apparatus according to claim 1, said cassette having a recording on a sleeve in the cassette made in a spiral, means for driving, said playback device, a worm engaged by said driving means, and means for automatically adjusting the position of the playback device with respect to a recording track axis.

5. Apparatus according to claim 4, said playback device being secured to a plate, a column connected to said plate to form an assembly, a vertical shaft slidably supporting said assembly fastened to the turntable, and a playback head being secured to an upper plate fastened to the turntable by a second vertical shaft for driving the turntable.

6. Apparatus according to claim 5, said plate having a slot, a shaft connecting the sides of the slot and including a first lever having a nose, a hollow in said nose formed with teeth; said worm engaging said teeth, and a second lever connected to said first lever comprising a fork having arms; a wheel supported on said arms; and a bar forming a portion of a stationary apparatus frame cooperating with said wheel.

7. Apparatus according to claim 6, comprising an arm pivotably mounted on a portion of the frame for guiding the cassette when introduced into playback device, and a rod formed integrally, with said guide arm, the end of which is adapted to co-operate with a tenon supported by an angle iron secured to the head mounting plate.

8. Apparatus according to claim 1, said recordings being disposed on a certain number of parallel tracks on a magnetic medium, the playback device being brought on to the required track during the second part of a selection process formulated by said counting and locating means, and the driving motor being secured on an upright, a shaft of said motor bearing a gearwheel engaging a rack formed on a column.

* * * * *